United States Patent [19]
Bromont et al.

[11] Patent Number: 5,929,152
[45] Date of Patent: Jul. 27, 1999

[54] COMPOSITIONS CONTAINING VINYLIDENE FLUORIDE POLYMERS WHICH ARE STABILIZED TO HEAT

[75] Inventors: Valérie Bromont, Montpellier; Jean-Jacques Robin, Clapiers, both of France; Etienne Hannecart, Tervuren, Belgium

[73] Assignee: Solvay (SociétéAnonyme), Brussels, Belgium

[21] Appl. No.: 08/828,145

[22] Filed: Mar. 24, 1997

[30] Foreign Application Priority Data

Mar. 22, 1996 [BE] Belgium ................ 09600257

[51] Int. Cl.$^6$ ............ C08K 5/098; C08L 27/16
[52] U.S. Cl. .......... 524/382; 524/396; 524/397; 524/399
[58] Field of Search ............... 524/382, 396, 524/397, 399

[56] References Cited

U.S. PATENT DOCUMENTS

| 2,560,160 | 7/1951 | Deutsch et al. ............ 260/45.75 |
| 5,373,062 | 12/1994 | Gardner et al. ............ 525/333.4 |

FOREIGN PATENT DOCUMENTS

| 0013839 | 8/1980 | European Pat. Off. . |
| 41-019821 | 11/1966 | Japan . |
| 275161 | 7/1951 | Switzerland . |

*Primary Examiner*—Frederick Krass
*Attorney, Agent, or Firm*—Venable; John W. Schneller

[57] ABSTRACT

The compositions contain, as heat stabilizer, an effective amount of bismuth carboxylate chosen from bismuth succinate, acrylate and terephthalate and their mixtures. In general, this amount is at least 0.05 part and does not exceed 5 parts per 100 parts by weight of vinylidene fluoride polymer. The heat stabilizers according to the invention are suitable both for the thermal stabilization of virgin polymers and for the stabilization/decoloration of thermally degraded waste polymers.

18 Claims, No Drawings

COMPOSITIONS CONTAINING VINYLIDENE FLUORIDE POLYMERS WHICH ARE STABILIZED TO HEAT

FIELD OF THE INVENTION

The present invention relates to compositions containing vinylidene fluoride polymers exhibiting an improved thermal stability. It more particularly relates to such compositions containing a bismuth carboxylate as heat stabilizer.

TECHNOLOGY REVIEW

Vinylidene fluoride polymers, which are thermoplastic homopolymers and copolymers, constitute well known polymers exhibiting an array of advantageous properties and, in particular, high chemical inertia and high resistance to ultraviolet radiation, as well as excellent mechanical strength. These polymers consequently know numerous applications in fields, such as for example in the chemical industry, which are particularly demanding as regards resistance to corrosion. In addition, these polymers exhibit an excellent intrinsic thermal stability, so that they are most often employed in the absence of any heat stabilizer.

Nevertheless, in applications in which these polymers are employed as a very thick layer, for example of the order of several tens of mm, thermal degradation can appear at the core of the material as a result of the severe thermal conditions to which it is subjected during the shaping of thick components. Likewise, problems of thermal stability emerge when vinylidene fluoride polymers of very high molecular weights are melt-shaped (for example for the shaping of articles requiring very high mechanical strength) and/or when vinylidene fluoride copolymers, the intrinsic thermal stability of which is less than that of the homopolymer, are melt-shaped. It thus proves to be currently desirable to have available heat stabilizers which are effective for vinylidene fluoride polymers.

A multitude of very diverse heat stabilizers have already been proposed for the (essential) thermal stabilization of chlorinated polymers, such as vinyl chloride polymers. In practice, they are most often salts of lead, calcium and/or zinc, barium and/or cadmium or alternatively organotins and thiotins.

Nevertheless, in Patent CH-A-275,161 of Apr. 20, 1948, a description is given of the thermal stabilization of vinyl chloride and vinylidene chloride polymers by the involvement of bismuth salts of highly varied organic acids, such as, for example, bismuth formate, maleate, laurate and stearate, preference being given to the bismuth salts of fatty acids having at least 12 carbon atoms.

The thermal stabilization of poly(vinyl chloride) polymers by the involvement of bismuth salts of $C_6$ to $C_{22}$ monocarboxylic acids, such as in particular bismuth stearate and salicylate, is recommended in Patent Application JP-A-66/19821 of Aug. 30, 1963. These bismuth salts are advantageously employed in conjunction with heat stabilizers, such as cadmium, barium, zinc or lead salts.

SUMMARY OF THE INVENTION

The present invention is targeted at providing heat stabilizers which are effective for vinylidene fluoride polymers.

To this end, the invention relates to compositions containing vinylidene fluoride polymers which are stabilized to heat by the involvement of an effective amount of bismuth carboxylate, characterized in that the bismuth carboxylate is chosen from bismuth succinate, acrylate and terephthalate and their mixtures.

Excellent results are obtained with the succinate and the acrylate and their mixtures. A very particularly preferred bismuth carboxylate is the succinate.

DETAILED DESCRIPTION OF THE INVENTION

A surprising aspect of the present invention is the fact that bismuth carboxylates described as being capable of contributing effectively to the thermal stabilization of chlorinated polymers, and which are moreover similar to the bismuth carboxylates employed in the compositions according to the invention, prove to be ineffective in stabilizing vinylidene fluoride polymers. Moreover, the effectiveness of the heat stabilizers according to the invention is such that they even make possible the stabilization/decoloration of thermally degraded waste vinylidene fluoride polymers.

Effective amount of bismuth carboxylate is understood to denote, for the purposes of the present invention, an amount which is sufficient to improve the thermal stability, that is to say to prevent the coloration of the compositions or, depending on the situation, to reduce the coloration of the compositions (in the case of the stabilization of waste polymers which are already degraded) when the latter are subjected to temperatures higher than the melting temperature of the vinylidene fluoride polymers and which are sufficient to be able to convert them into shaped articles. This amount is not particularly critical and depends, in particular, on the nature, on the molecular weight and, if appropriate, on the extent of the thermal degradation of the vinylidene fluoride polymers which it is desired to stabilize. To give an idea, the bismuth carboxylate is generally employed in the proportion of at least 0.05 part by weight, most often at least 0.1 part by weight and more particularly still at least 0.3 part by weight per 100 parts by weight of vinylidene fluoride polymer. In general, the bismuth carboxylate content does not exceed 5 parts by weight; most often it does not exceed 3 parts by weight and more particularly still 1.5 parts by weight per 100 parts by weight of vinylidene fluoride polymer.

The manufacture of the bismuth carboxylates employed in the compositions according to the invention does not have a critical nature. The carboxylates can therefore be manufactured in any appropriate way. It is possible, for example, to manufacture them by a wet route by reacting, in water at room temperature, stoichiometric amounts of bismuth hydroxide and carboxylic acid (succinic, acrylic or terephthalic acid or their mixtures), followed by filtration of the bismuth salt. It is also possible to manufacture them by a dry route, for example by dry mixing/grinding, for a few minutes, appropriate amounts of bismuth trioxide and the carboxylic acid (mechanochemical reactions), followed by reheating the reaction mixture to complete the reaction.

The bismuth carboxylate can be employed in any form, for example powder or aqueous dispersion. However, for reasons of convenience, it is preferable to employ it in the form of a powder. In this case, it is advantageous to use powders in which the particles exhibit a mean diameter of less than approximately 100 $\mu$m. The mean diameter of the bismuth carboxylate particles is preferably between approximately 0.1 and 30 $\mu$m.

In addition to the bismuth carboxylate, the compositions according to the invention can contain the usual additives for vinylidene fluoride polymers, such as lubricating agents, pigments, additives which reduce the emission of smoke during combustion ("smoke-suppressants"), and the like. In general, the compositions according to the invention do not contain a heat stabilizer other than the bismuth carboxylate.

Vinylidene fluoride polymer is understood to denote, for the purposes of the present invention, both vinylidene fluoride homopolymers and thermoplastic copolymers of vinylidene fluoride and of ethylenically unsaturated comonomers, which are advantageously fluorinated, containing at least approximately 75% by weight of monomer units derived from vinylidene fluoride. The said thermoplastic copolymers advantageously exhibit a melting temperature at least equal to 130° C. and preferably at least equal to 150° C. and more particularly still 165° C. Mention may be made, as examples of fluorinated comonomers which can be used, of hexafluoropropylene and chlorotrifluoroethylene.

The vinylidene fluoride polymers of the compositions according to the invention are advantageously chosen from vinylidene fluoride homopolymers and its thermoplastic copolymers with hexafluoropropylene or chlorotrifluoroethylene, and more particularly with chlorotrifluoroethylene. The thermoplastic copolymers of vinylidene fluoride and of hexafluoropropylene advantageously contain from 5 to 20% by weight approximately of hexafluoropropylene and more particularly still from 8 to 15% by weight approximately. The latter particularly preferred copolymers exhibit melting temperatures from approximately 160 to approximately 135° C.

The thermoplastic copolymers of vinylidene fluoride and of chlorotrifluoroethylene advantageously contain from 10 to 25% by weight approximately of chlorotrifluoroethylene and more particularly still from 12 to 22% by weight approximately. The latter particularly preferred copolymers exhibit melting temperatures from approximately 170 to approximately 165° C.

The vinylidene fluoride polymers which take part in the compositions according to the invention can be composed without distinction of virgin polymers or of waste polymers (or alternatively of mixtures of these polymers). In the case where virgin polymers are concerned, the latter are most often provided in the form of powders, the particles of which exhibit a mean diameter from approximately 50 to 200 μm and most often from approximately 100 to 140 μm. In the case where waste polymers are concerned, it is of course advisable, prior to the incorporation of the bismuth carboxylate, to grind and/or micronize the shaped articles made of waste vinylidene fluoride polymers, for the purpose of reducing them to ground particles (ground materials) of reduced size. The waste polymer ground materials preferably have a mean diameter not exceeding 5 mm and more particularly still 2 mm.

Likewise, in the case of the thermal stabilization of thermally degraded waste polymers, it can be advantageous, although not essential, to subject the ground materials to a pretreatment by means of hydrogen peroxide. In this case, the incorporation of bismuth carboxylate is preceded by a treatment of the ground materials by means of hydrogen peroxide. The said treatment advantageously takes place with stirring in an aqueous hydrogen peroxide solution, for example a 35% solution, for a few tens of minutes to a few hours, advantageously for approximately 2 hours, at a temperature ranging from approximately 80 to 100° C. After the treatment with hydrogen peroxide, the vinylidene fluoride polymer is filtered, washed with water and then dried.

The preparation of the compositions according to the invention does not exhibit any particular problem. All the conventional techniques which allow the incorporation of processing aids in thermoplastic polymers in order to form mixtures which exist in the powder or granule form can be used. Thus, the bismuth carboxylate can be mixed with the vinylidene fluoride polymer from the polymerization stage, either by direct introduction into the polymerization mixture, at the end of polymerization, or alternatively by addition to the wet cake obtained by draining or filtration of the aqueous dispersion coming from polymerization. It is understood that this method of incorporation is only suited to the compositions according to the invention composed of virgin vinylidene fluoride polymer. An advantageous procedure, which can be used in all cases, comprises the addition of the bismuth carboxylate to the polymer, which is in the form of a powder (or of a ground material), during the manufacture of a premix, at the same time as the other additives which take part in the composition. The bismuth carboxylate can also be introduced directly into the devices where the vinylidene fluoride polymer is melted, such as screw extruders. In this case, the stabilized composition will exist in the form of granules (compounds).

The bismuth carboxylates employed in the compositions according to the invention have an effectiveness such that they are suitable not only for the manufacture of very thick components, such as slabs or rods, and for the employment of vinylidene fluoride polymers of very high molecular weights and/or of vinylidene fluoride copolymers with a thermal stability which is lower than that of the homopolymers but also for the stabilization/decoloration of thermally degraded waste vinylidene fluoride polymers, making possible the recycling of ground materials from waste articles.

The compositions according to the invention are capable of being made use of by all conventional techniques for the conversion of molten thermoplastics, such as extrusion and moulding.

EXAMPLES

The following examples are intended to illustrate the invention.

Examples 1 to 4 relate to virgin compositions containing vinylidene fluoride polymers.

Examples 5 to 11 relate to thermally degraded waste compositions containing vinylidene fluoride polymers. The bismuth carboxylates employed in the compositions exist as particles with a mean diameter <30 μm.

Examples 1 to 4

In Example 1 (given by way of comparison) and in Example 2 (according to the invention), the preparation was carried out of vinylidene fluoride/chlorotrifluoroethylene copolymer compositions containing 15% by weight of chlorotrifluoroethylene (VF2-CTFE) which have a melting temperature of 169° C. and a melt index (MI), measured at 230° C. under a load of 5 kg, of 15 g/10 min (ASTM D 1238). These compositions contain the following ingredients, all the parts being expressed by weight:

| Ingredients | Amount |
| --- | --- |
| VF2-CTFE | 100 |
| Ca molybdate (smoke-suppressant) | 0.3 |
| Polyethylene wax (lubricant) | 0.2 |
| Precipitated $CaCO_3$ | 0.1 |

The composition according to Example 2 additionally contains 1 part by weight of bismuth succinate.

These compositions were mixed in a mixer of Brabender type at 270° C. with a speed of the shafts of 50 r/min and crepes were withdrawn every five minutes for the purpose of assessing their coloration.

After mixing for 5 minutes, the compositions according to Examples 1 and 2 are still white.

After mixing for 25 minutes, the composition according to Example 1 (without bismuth succinate) is brown; after 30 minutes it is black.

After mixing for 25 minutes, the composition according to Example 2 is still white, after 30 minutes it is light beige and after 50 minutes it is still beige.

Comparison of the results of Examples 1 and 2 shows the exceptional thermal stabilizing effect of bismuth succinate.

In Example 3 (comparative) and in Example 4 (according to the invention), the preparation was carried out of compositions containing a vinylidene fluoride homopolymer (PVDF) of high molecular weight (MI: 0.2 g/10 min) and a VF2-CTFE copolymer identical to that employed in Examples 1 and 2. These compositions contain the following ingredients, all the parts being expressed by weight:

| Ingredients | Amount |
| --- | --- |
| PVDF | 67 |
| VF2-CTFE | 33 |
| Polyethylene wax | 0.067 |

The composition according to Example 4 additionally contains 1 part by weight of bismuth succinate.

These compositions were mixed at 270° C. under the same conditions as in Examples 1 and 2 and crepes were withdrawn for the purpose of assessing the coloration.

After 10 minutes, the composition according to Example 3 is brown, after 20 minutes it is blackish.

The composition according to Example 4 is still off-white after 15 minutes; it is very slightly coloured (very light beige) after 20 minutes and becomes brownish after 50 minutes (shade virtually identical to that achieved by the composition according to Example 3 after 10 minutes).

Comparison of the results of Examples 3 and 4 fully shows the effectiveness of bismuth succinate.

Examples 5 to 11

In Examples 5 to 11, the preparation was carried out of compositions from thermally degraded waste PVDF homopolymer originating from waste chemical engineering pipes (several years of everyday use). The recovered pipes were ground so as to be obtain ground materials, the particles of which exhibit a mean diameter of <2 mm.

In all these examples, except in Example 5, given by way of comparison, 1 part by weight of bismuth carboxylate was incorporated (the nature of which carboxylate is specified in the appended Table I).

In a first stage, the PVDF ground materials and bismuth carboxylate were mixed with stirring for 15 minutes (planetary stirrer rotating at 20 r/min). These premixes were then mixed for 3 minutes at 180° C. in a mixer (of Brabender type) provided with blades rotating at 32 r/min. The crepes thus obtained were finally pressed at 210° C. for 5 minutes in a mould maintained under a pressure of 50 bars. The pressed slabs were then examined. The colorations observed are taken up in the appended Table I.

From the comparison of the results which appear in the appended Table I, it is evident that bismuth succinate, acrylate and terephthalate contribute a very appreciable decoloration to thermally degraded PVDF (cf. Example 5 given by way of comparison), which reflects an appreciable improvement in its thermal stability.

The bismuth carboxylates employed in the comparative examples (Examples 9, 10 and 11) are markedly less effective. In this respect, it is interesting to compare the results of the maleate (unsaturated $C_4$ dicarboxylate) or alternatively of the oxalate (saturated $C_2$ dicarboxylate) with those of the succinate (saturated $C_4$ dicarboxylate).

TABLE

| No. of the Example | Bi carboxylate | Coloration of the pressed slab |
| --- | --- | --- |
| 5 (C) | None | brown-black |
| 6 | succinate | white-beige |
| 7 | acrylate | light beige |
| 8 | terephthalate | light beige |
| 9 (C) | maleate | dark beige-brown |
| 10 (C) | oxalate | dark beige-brown |
| 11 (C) | formate | dark beige-brown |

What is claimed is:

1. A heat stabilized composition containing vinylidene fluoride polymer composed of waste polymer provided in the form of ground material from shaped articles, said composition being heat stabilized by an effective amount of bismuth carboxylate selected from the group consisting of bismuth succinate, bismuth acrylate and bismuth terephthalate and mixtures thereof.

2. The composition containing vinylidene fluoride polymer according to claim 1, wherein the ground material is subjected to a pretreatment by means of hydrogen peroxide.

3. A heat stabilized composition containing vinylidene fluoride polymer composed of waste polymer provided in the form of ground material from shaped articles which is stabilized to heat by an effective amount of bismuth carboxylate selected from the group consisting of bismuth succinate, bismuth acrylate and bismuth terephthalate and mixtures thereof, wherein the bismuth carboxylate is present in the proportion of at least 0.05 part by weight per 100 parts by weight of vinylidene fluoride polymer, and does not exceed 5 parts by weight per 100 parts by weight of vinylidene fluoride polymer, and wherein the vinylidene fluoride polymer is selected from the group consisting of vinylidene fluoride homopolymer and its thermoplastic copolymers with hexafluoropropylene or chlorotrifluoroethylene.

4. A heat stabilized composition containing vinylidene fluoride polymer composed of waste polymer provided in the form of ground material from shaped articles which is stabilized to heat by an effective amount of bismuth carboxylate selected from the group consisting of bismuth succinate, bismuth acrylate and bismuth terephthalate and mixtures thereof, wherein the bismuth carboxylate is present in the proportion of at least 0.05 part by weight per 100 parts by weight of vinylidene fluoride polymer, and does not exceed 5 parts by weight per 100 parts by weight of vinylidene fluoride polymer, and wherein the bismuth carboxylate is present in the form of a powder, and wherein the vinylidene fluoride polymer is selected from the group consisting of vinylidene fluoride homopolymer and its thermoplastic copolymers with hexafluoropropylene or chlorotrifluoroethylene.

5. The composition containing vinylidene fluoride polymer according to claim 1, wherein the bismuth carboxylate is selected from the group consisting of bismuth succinate and bismuth acrylate and mixtures thereof.

6. The composition containing vinylidene fluoride polymer according to claim 1, wherein the bismuth carboxylate is bismuth succinate.

7. The composition containing vinylidene fluoride polymer according to claim 1, wherein the bismuth carboxylate is present in a proportion of at least 0.05 part by weight per 100 parts by weight of the vinylidene fluoride polymer.

8. The composition containing vinylidene fluoride polymer according to claim 7, wherein the bismuth carboxylate content does not exceed 5 parts by weight per 100 parts by weight of vinylidene fluoride polymer.

9. The composition containing vinylidene fluoride polymer according to claim 1, wherein the bismuth carboxylate content does not exceed 5 parts by weight per 100 parts by weight of vinylidene fluoride polymer.

10. The composition containing vinylidene fluoride polymer of claim 7, wherein the bismuth carboxylate is present in the form of a powder.

11. The composition containing vinylidene fluoride polymer according to claim 8, wherein the bismuth carboxylate it present in the form of a powder.

12. The composition containing vinylidene fluoride polymer according to claim 9, wherein the bismuth carboxylate is present in the form of a powder.

13. The composition containing vinylidene fluoride polymer according to claim 1, wherein the bismuth carboxylate is present in the form of a powder.

14. The composition containing vinylidene fluoride polymer according to claim 1, wherein the vinylidene fluoride polymer is selected from the group consisting of vinylidene fluoride homopolymer and its thermoplastic copolymers with hexafluoropropylene or chlorotrifluoroethylene.

15. The composition containing vinylidene fluoride polymer according to claim 7, wherein the vinylidene fluoride polymer is selected from the group consisting of vinylidene fluoride homopolymer and its thermoplastic copolymers with hexafluoropropylene or chlorotrifluoroethylene.

16. The composition containing vinylidene fluoride polymer of claim 9, wherein the vinylidene fluoride polymer is selected from the group consisting of vinylidene fluoride homopolymer and its thermoplastic copolymers with hexafluoropropylene or chlorotrifluoroethylene.

17. The composition containing vinylidene fluoride polymer of claim 12, wherein the vinylidene fluoride polymer is selected from the group consisting of vinylidene fluoride homopolymer and its thermoplastic copolymers with hexafluoropropylene or chlorotrifluoroethylene.

18. The composition containing vinylidene fluoride polymer according to claim 13, wherein the vinylidene fluoride polymer is selected from the group consisting of vinylidene fluoride homopolymer and its thermoplastic copolymers with hexafluoropropylene or chlorotrifluoroethylene.

* * * * *